US006947378B2

(12) United States Patent
Wu et al.

(10) Patent No.: US 6,947,378 B2
(45) Date of Patent: Sep. 20, 2005

(54) DYNAMIC NETWORK RESOURCE ALLOCATION USING MULTIMEDIA CONTENT FEATURES AND TRAFFIC FEATURES

(75) Inventors: Min Wu, Princeton, NJ (US); Robert A. Joyce, Princeton, NJ (US); Anthony Vetro, Staten Island, NY (US); Hau-San Wong, Causeway Bay (HK); Ling Guan, Bexley North (AU); Sun-Yuan Kung, Princeton, NJ (US)

(73) Assignee: Mitsubishi Electric Research Labs, Inc., Cambridge, MA (US)

( * ) Notice: Subject to any disclaimer, the term of this patent is extended or adjusted under 35 U.S.C. 154(b) by 832 days.

(21) Appl. No.: 09/795,952

(22) Filed: Feb. 28, 2001

(65) Prior Publication Data

US 2002/0150044 A1 Oct. 17, 2002

(51) Int. Cl.[7] ......................... G01R 31/08; G06F 11/00; G08C 15/00; H04L 1/00; H04L 12/26

(52) U.S. Cl. ..................... 370/229; 370/241; 704/270.1

(58) Field of Search ................................. 370/229, 241, 370/230, 235, 231, 232, 233, 234, 236, 395.1, 468, 477, 395.21, 230.1, 395.4, 395.43, 395.41; 704/270.1

(56) References Cited

U.S. PATENT DOCUMENTS 5,675,384 A * 10/1997 Ramamurthy et al. . 375/240.04
5,838,663 A * 11/1998 Elwalid et al. ............. 370/233
6,040,866 A * 3/2000 Chen et al. .............. 348/419.1
6,067,534 A * 5/2000 Terho et al. .................... 706/2
6,263,016 B1 * 7/2001 Bellenger et al. ........... 375/222
6,269,078 B1 * 7/2001 Lakshman et al. .......... 370/230
6,320,867 B1 * 11/2001 Bellenger et al. ........... 370/420
6,665,872 B1 * 12/2003 Krishnamurthy et al. ..... 725/95
6,721,355 B1 * 4/2004 McClennon et al. ........ 375/222
6,754,241 B1 * 6/2004 Krishnamurthy et al. ... 370/537

OTHER PUBLICATIONS

Bocheck et al.; "Content–Based VBR Video Traffic Modeling and Its Application to Dynamic Network Resource Allocation"; Columbia University Technical Report 486–98–20, Jan. 1998.

Chang et al.; "Principles and Applications of Content–Aware Video Communication"; ISCAS, May, 2000.

Knightly et al.; "D–BIND: An Accurate Traffic Model for Providing QoS Guarantees to VBR Traffic"; IEEE/ACM Transactions on Networking, vol. 5, No. 2, Apr., 1997. pp. 219–231.

* cited by examiner

*Primary Examiner*—Wellington Chin
*Assistant Examiner*—Jamal A. Fox
(74) *Attorney, Agent, or Firm*—Dirk Brinkman; Andrew J. Curtin

(57) ABSTRACT

A method for dynamically allocating network resources while transferring multimedia at variable bit-rates in a network extracts first content features from the multimedia to determine renegotiation points and observation periods. Second content features and traffic features are extracted from the multimedia bit stream during the observation periods. The second content features and the traffic features are combined in a neural network to predict the network resources to be allocated at the renegotiation points.

24 Claims, 12 Drawing Sheets

500

| Feature | Description | Feature | Description |
|---|---|---|---|
| 1 | I frame complexity | 10 | Mean MV magnitude, lower-right |
| 2 | Mean MV magnitude | 11 | Var. of MV *x* components |
| 3 | Var. of MV direction histogram | 12 | Var. of MV *y* components |
| 4 | Fraction of Intracoded MB's | 13 | Cov. of MV *x* and *y* comp. |
| 5 | Mean maginfied of accel vectors | 14 | Var. of MV magnitudes |
| 6 | Mean change in MV magnitudes | 15 | Short-term D-BIND $r^1$ |
| 7 | Mean MV magnitude upper-left | 16 | Short-term D-BIND $r^2$ |
| 8 | Mean MV magnitude, upper-right | 17 | Short-term D-BIND $r^3$ |
| 9 | Mean MV magnitude, lower-left | 18 | Short-term D-BIND $r^4$ |

DYNAMIC NETWORK RESOURCE ALLOCATION USING MULTIMEDIA CONTENT FEATURES AND TRAFFIC FEATURES

FIELD OF THE INVENTION

The present invention relates generally to a method and system for allocating network resources for bit streams, and more particularly to dynamically allocating resources for multimedia bit streams.

BACKGROUND OF THE INVENTION

Networks are the principal means for communicating multimedia between communication devices. The content of the multimedia can include data, audio, text, images, video, etc. Communication devices include input/output devices, computers, terminals, multimedia workstations, fax machines, printers, servers, telephones, and personal digital assistants.

A multimedia network typically includes network switches connected to each other and to the communication devices by circuits. The circuits can be physical or virtual. In the latter case, the circuit is specified by a source and destination address. The actual physical circuit used will vary over time, depending on network traffic and resource requirements and availability, such as bandwidth.

The multimedia can be formatted in many forms, but increasingly it is formatted into packets. Packets in transit between the communication devices may temporarily be stored in buffers at the switches along the path of the circuit pending sufficient available bandwidth on subsequent circuits along the path.

Important considerations in network operation are admission control and resource allocation. Typically, admission control and resource allocation are ongoing processes that are performed periodically during transmission of bit streams. The admission control and resource allocation determinations may take into account various factors such as network topology and current available network resources, such as buffer space in the switches and capacity in the circuits, any quality-of-service commitments (QoS), e.g., guaranteed bandwidth, and delay or packet loss probabilities.

The admission control and resource allocation problem is complicated when a variable bit-rate (VBR) multimedia source or communications device seeks access to the network and requests a virtual circuit for streaming data. The complication arises because the features, which describe the variations in content of the multimedia, are often imprecise. Thus, it is difficult to predict what the requirements for network resources, such as requirements for bandwidth, by the VBR source will be in the future. For example, the bandwidth requirements of VBR sources typically vary with time, and the bandwidth variations typically are difficult to characterize. Thus, the admission-allocation determination is made with information that may not accurately reflect the demands that the VBR source may place on the network, thereby causing degraded network performance.

More particularly, if the network resource requirements are overestimated, then the network will run under capacity. Alternatively, if the network resources requirements are underestimated, then the network may become congested and packets traversing the network may be lost, see, e.g., Roberts, "*Variable-Bit-Rate Traffic-Control in B-ISDN*," IEEE Comm. Mag., pp. 50–56, September 1991; Elwalid et al, "*Effective Bandwidth of General Markovian Traffic Sources and Admission Control of High Speed Networks*," IEEE/ACM Trans. on Networking, Vol. 1, No. 3, pp. 329–343, 1993. Guerin et al., "*Equivalent Capacity and its Application to Bandwidth Allocation in High-Speed Networks*," IEEE J. Sel. Areas in Comm., Vol. 9, No. 7, pp. 968–981, September 1991.

Transmission of digital multimedia over bandwidth-limited networks will become increasingly important in future Internet and wireless communication. It is a challenging problem to cope with ever changing network parameters, such as the number of multimedia sources and receivers, the bandwidth required by each stream, and the topology of the network itself. Optimal resource allocation should dynamically consider global strategies, i.e., global network management, as well as local strategies, such as, admission control during individual connections.

Bandwidth allocation and management for individual bit streams is generally done at the "edges" of the network in order to conserve computational resources of the network switches. While off-line systems can determine the exact bandwidth characteristics of a stream in advance, in many applications, on-line processing is desired or even required to keep delay and computational requirements low. Furthermore, any information used to make bandwidth decisions should be directly available in the compressed bit stream. It is desirable to have a resource management system that can accurately estimate the required bandwidth in real-time using only compressed domain information.

Resource Renegotiating for VBR Video

Of all multimedia, it is particularly desired to improve resource allocation for VBR video and audio data. These are becoming increasingly popular due to their consistent visual and acoustic quality. The hallmark of VBR data is that bandwidth undergoes both short-term and long-term changes, in reaction to the complexity and therefore, compressibility of the underlying content. Moreover, the long-term variations are more difficult to handle and being able to predict the estimated bandwidth over longer intervals is desired.

As stated above, allocating a constant amount of bandwidth to a VBR stream will usually yield one or more results: inefficient use of network resources, due to over or under-allocated bandwidths, and a requirement of large network buffers and consequent delay. Therefore, the bandwidth requests made by the VBR source should be periodically renegotiated in order to obtain high network utilization and low delay. Determining appropriate renegotiation points is also a problem. If renegotiation is too frequent, overhead increases. On the other hand, if the renegotiation is infrequent, coarse estimations are made.

Conventional methods typically renegotiate resources according to changes in bit stream level statistics, see Zhang et al., "*RED-VBR: A new approach to support delay-sensitive VBR video in packet-switched networks*," Proc. NOSSDAV, pp. 258–272 1995. The relationship between past and future traffic is parametrically modeled in techniques described by Chong et al, "*Predictive dynamic bandwidth allocation for efficient transport of real-time VBR video over ATM*," IEEE J. Sel. Areas of Comm., Vol. 13, No. 1, pp. 12–23, 1995, and Izquierdo et al. "*A survey of statistical source models for variable bit-rate compressed video*," Multi-media Systems, Vol. 7, No. 3, pp. 199–213, 1999, and references therein.

Content-based methods are motivated by the high correlation between long-term traffic characteristics and video content, see Dawood et al, "*MPEG video modeling based on scene description*," Proc. IEEE ICIP, Vol. 2, pp. 351–355, 1998, and Bocheck et al, "*Content-based VBR traffic modeling and its application to dynamic network resource allocation*," Research Report 48c-98-20, Columbia Univ., 1998. Although multimedia content is a major factor in determining the bandwidth allocation, content alone may not be sufficient for predicting future traffic and in estimating how much resource to request.

Bandwidth Renegotiation Points

In the prior art, on-line determination of bandwidth renegotiation points for VBR content generally falls into three categories: deterministic, traffic-based, and content-based.

Deterministically setting the renegotiation points is the simplest method. Bandwidth requests are made every n frames, where n is an empirically determined balance between request overhead and correlation of bit-rates.

Traffic-based renegotiation occurs when a stream exceeds a previously negotiated bandwidth request, or when utilization drops below some threshold level. Although traffic-based renegotiation tracks the real bandwidth more closely, a single complex frame in a video can cause the requested bandwidth to remain unnecessarily elevated for some time.

A more "natural" renegotiation point is content-based, for example, a scene or "shot" boundary. A shot is defined as all frames acquired in a continuous sequence between when the camera's shutter opens and closes. By examining the bits used per frame in the VBR video, one can learn that the most dramatic change in bit usage occurs at the beginning of a new segment. Within a single segment, the traffic characteristics are usually relatively constant. If a segment has a sudden change in content features, the change can be considered another segment boundary, as far as renegotiation is concerned.

Many methods are known for finding segment boundaries in the compressed domain, see, for example, Yeo et al, "*Rapid scene analysis on compressed video*," IEEE Tr. Circuits and Systems for Video Tech., vol. 5, No. 6, pp. 533–544, 1995. That method uses a windowed relative threshold on the sum of absolute pixel differences, and allows for fast, on-line determination of renegotiation points.

Bandwidth Request Per Interval

The next step is to determine how much resource to request at each renegotiation point, without introducing significant delay. For natural renegotiation points such as segment boundaries, previous traffic cannot generally help to determine how much resource to request when the traffic pattern has changed. With the requirement of on-line processing in mind, one can predict the traffic for the entire segment based on a short observation of the beginning part of a new segment, as illustrated in FIG. 1.

In FIG. 1, a video source 101 has segment boundaries 102, and observation periods 103. Bandwidth renegotiation points 104 occur after the observation periods 103. The video 101 is transmitted using the newly allocated bandwidth if the resources are granted at 105. The observation periods will inevitably introduce a short delay in renegotiation. The video can be transmitted without delay 110. With this approach, over-requested traffic may occur during time intervals t 111. A network buffer can smooth this traffic out if t is small. For applications tolerating a short-delay, the video 120 may be transmitted with t-second delay 121 so that the video traffic is within the bounds of the negotiated agreement.

The content-based prediction method described by Bocheck et al. includes training and testing stages. In the training stage, content features of a training video are quantized into a small number of levels, e.g., slow, medium, or fast motion. Every possible combination of significant features is labeled as a content class for which a typical traffic pattern is determined. During testing, the content class of each segment in the video is identified by extracting the same features, and the typical traffic pattern of the class is used as the predicted traffic for that segment.

However, the Bocheck method has some potential weaknesses. First, the specific prediction structure, via classification, can only feasibly incorporate a limited number of coarsely quantized features; each feature is weighted equally, rather than by its relevance to traffic. Second, prediction based solely on content may not be applicable for bit streams produced with different encoding algorithms or parameters. Third, not all available information during the observation periods is used at the renegotiation points.

Inaccurate predictions can cause allocation requests not to be granted or insufficient resources to be requested. This may result in denial of service, dropped packets, or transcoding to a lower bit-rate, perhaps with degraded quality.

Therefore, there is a need for an improved method and system for dynamically allocating network resources at renegotiation points while transferring multimedia content over a network.

SUMMARY OF THE INVENTION

Dynamic resource allocation is critical in the transmission of multimedia bit streams, especially video and audio data. Although content is one of the major factors that controls the bandwidth requirements for the bit streams, content alone is insufficient for predicting future traffic patterns and for determining how much network resources to request. The present invention provides a method for dynamically predicting resource requirements taking into account both content features and available short-term traffic features.

More specifically, the invention provides a method and system for dynamically allocating network resources while transferring a bit stream in a network. The method extracts first content features from the bit stream to determine renegotiation points and observation periods. Second content features and traffic features are extracted from the bit stream during the observation periods. The second content features and the traffic features are combined in a prediction neural network to determine the network resources to be allocated at the renegotiation points. The bit stream can have a variable or constant bit-rate. The features to be extracted can be selected from a training bit stream using either sequential forward selection or a consistency measure, or a combinartion of both.

BRIEF DESCRIPTION OF THE DRAWINGS

FIG. 5 is a block diagram of candidate and selected features for input to the neural network of FIG. 4;

DETAILED DESCRIPTION OF THE PREFERRED EMBODIMENT

Figure 1:
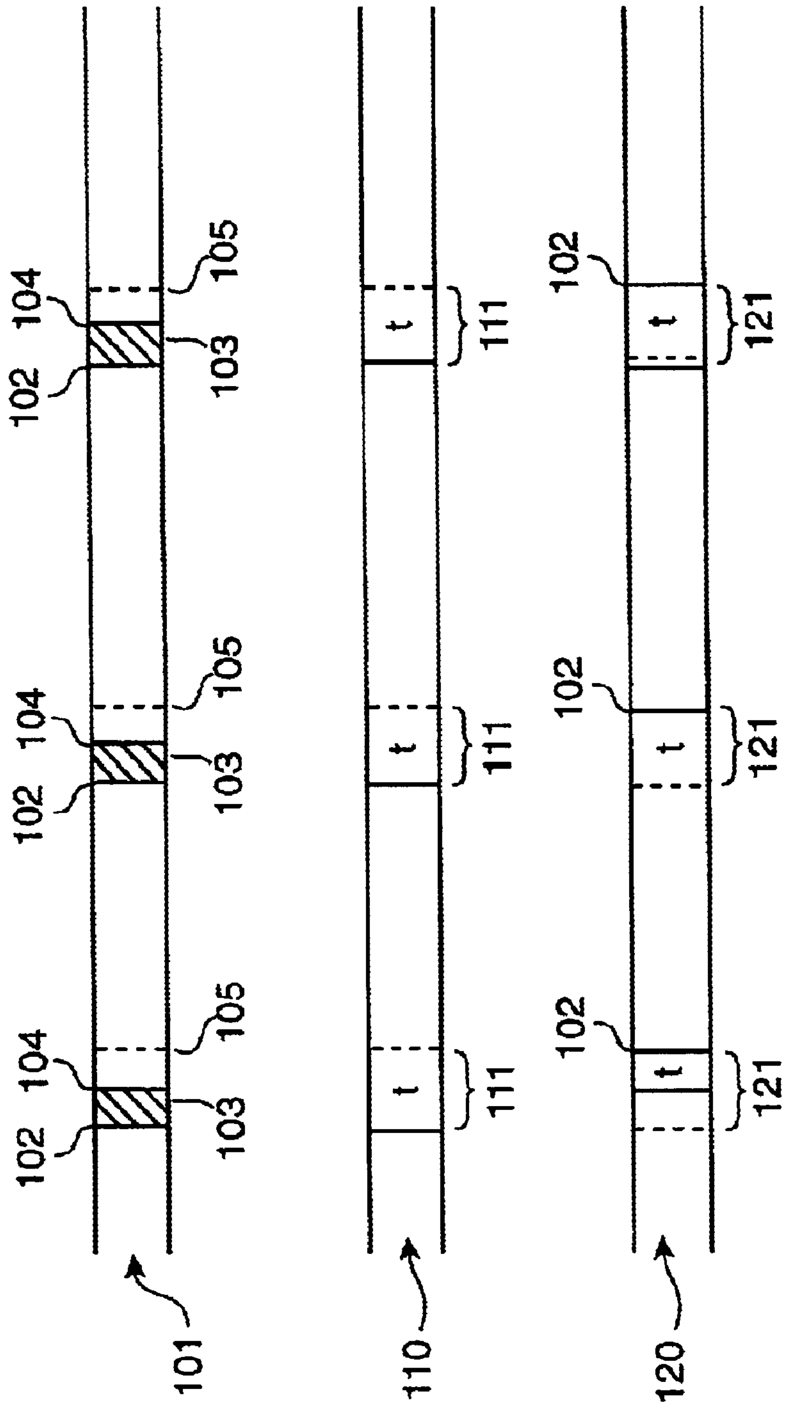
FIG. 1 is a timing diagram of a prior art content-based traffic modeling method.
Figure 2:
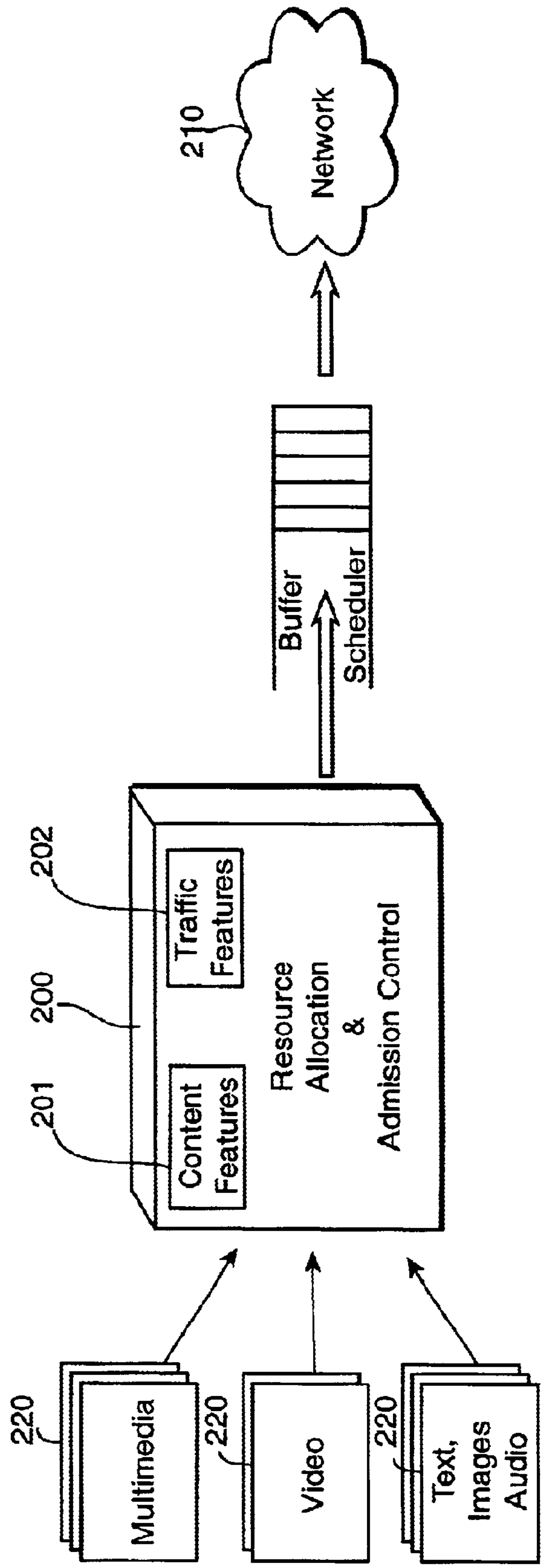
FIG. 2 is a block diagram of a dynamic resource allocation method and system according to the invention.

As shown in FIG. 2, our invention provides a method and system 200 for dynamically allocating resources of a network 210 for multimedia bit streams 220. The bit streams can use variable or constant bit-rates. Our invention uses both content features 201 and traffic features 202 of the multimedia streams. The content and traffic features can be obtained periodically, for example, during observation periods at the beginning of segments, or at other points in time when the content and traffic features of the multimedia change substantially.

Figure 3:
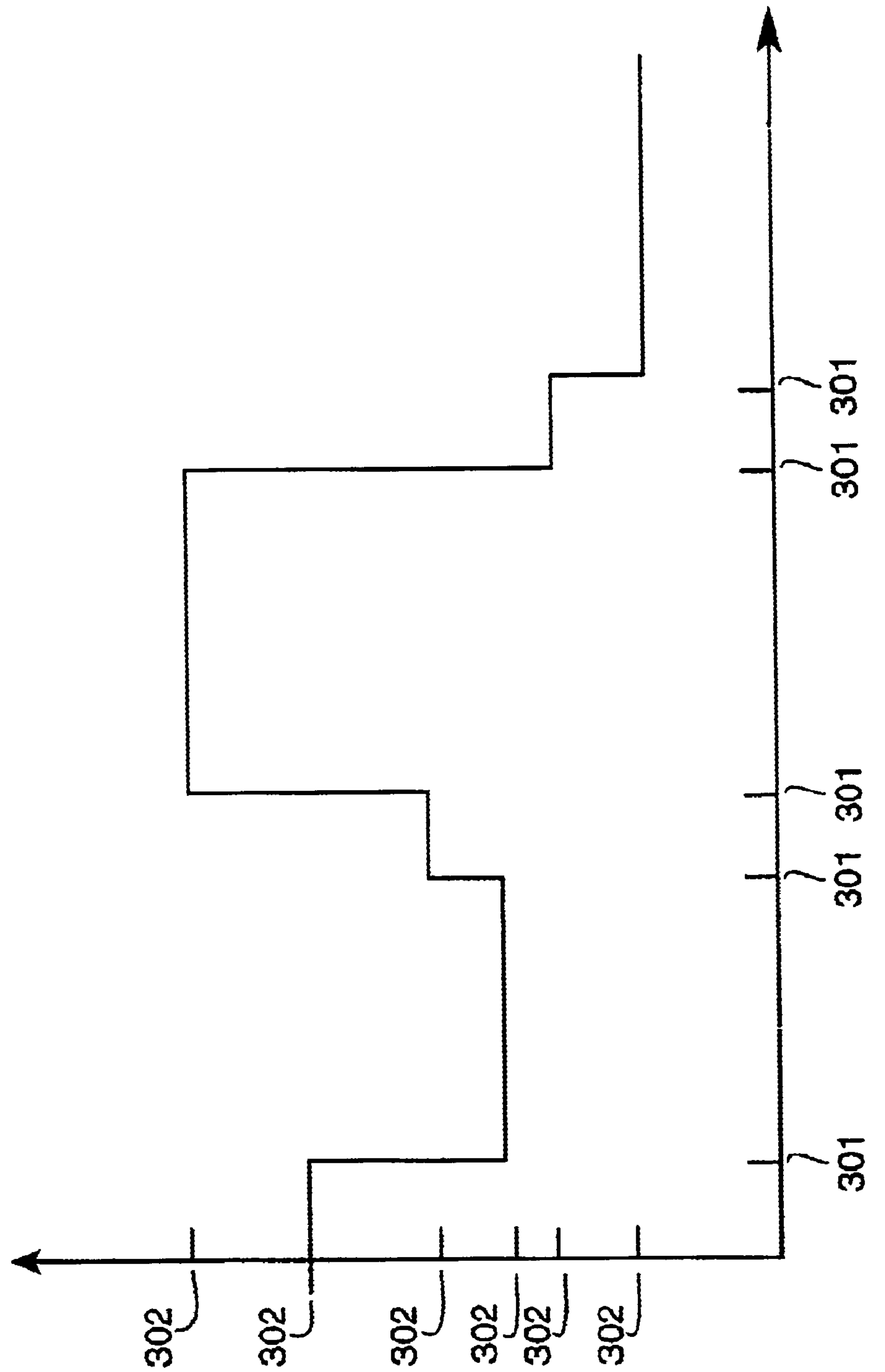
FIG. 3 is a graph of bandwidth requests at renegotiation points according to the invention.

As shown in FIG. 3, we use the content and traffic features to determine negotiation points 301, and to predict bandwidth requests 302 for the multimedia at the renegotiation points. Our method improves the accuracy of the prediction. Our method can also be used to evaluate contribution made by various multimedia sources. Thus, our method can be used to construct dynamic allocation systems with different trade-off characteristics depending on the evaluation.

Although the problem of predicting long-term or future traffic based on short-term traffic can be handled via parametric modeling, it is difficult to derive a simple and effective parametric model when incorporating content features. For this reason, we describe the use of a prediction neural network to accomplish the prediction task.

Figure 4:
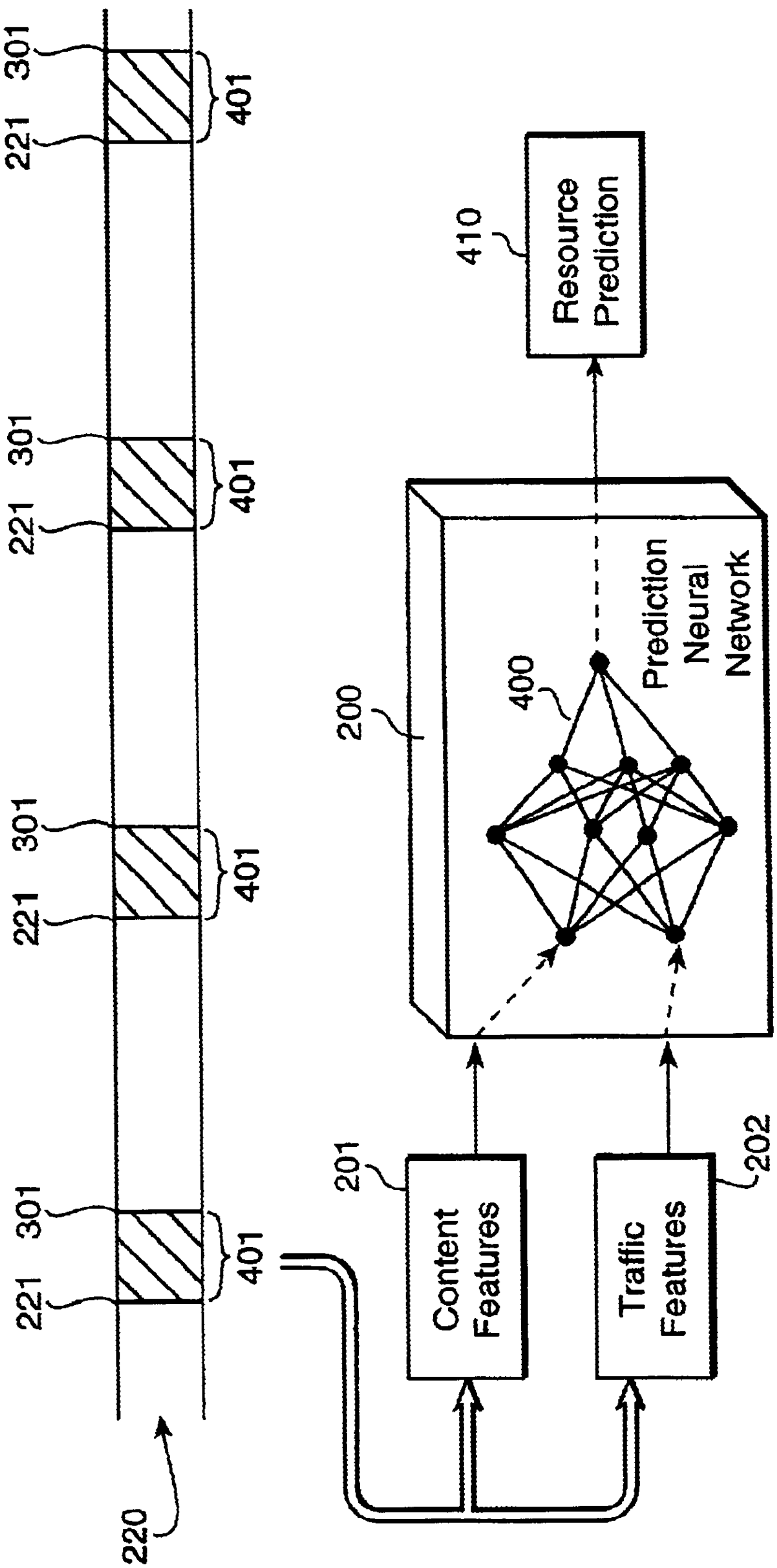
FIG. 4 is a block diagram of a prediction neural network used by the invention.

As shown in FIG. 4, we extract content features from the multimedia bit stream 220 to determine segment boundaries 221 and renegotiation points 301. We prefer the "cut" detector method as described by Yeo et al, "*Rapid scene analysis on compressed video,*" IEEE Tr. Circuits and Systems for Video Tech., vol. 5, no. 6, pp. 533–544, 1995. Other content boundary detection methods, using motion, color, audio features, or combinations thereof, can also be used to segment multimedia 220.

We use the time between the content boundaries 221 and the renegotiation points 301 as observation periods 401. During each observation period 401, we extract additional content features 201 and traffic features 202.

The observed content and traffic features are classified and analyzed, and selected features and features are combined by the prediction neural network 400. Note, the combining in the prediction neural network can be weighted on a range of zero to one. For example, in some applications, the weight of the content features can be zero and the weight of the traffic features can be one so that the prediction is entirely based on the traffic features. Back-propagation, as describe by Kung, "*Digital Neural Networks,*" Prentice Hall, 1993, can be applied during training to determine the weights. The prediction neural network predicts network resources 410 required at the renegotiation points 301 from the combined content and traffic features.

Feature Selection

FIG. 5 shows a set of eighteen possible candidate features 500 that can be extracted from the multimedia 220 in the compressed domain. The features include content features (1–14) and short term traffic features (15–18). The traffic features are described in greater detail below.

Figure 6:
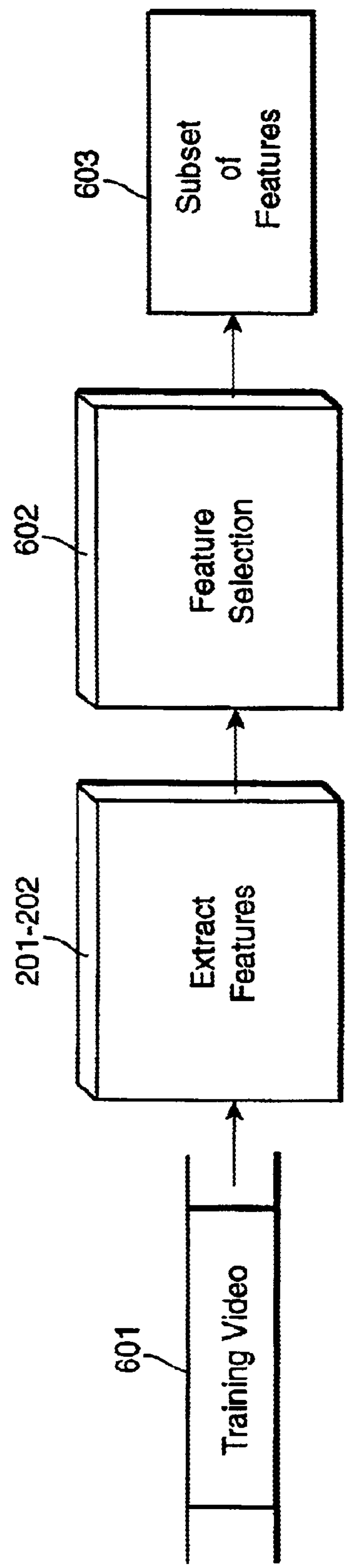
FIG. 6 is a block diagram of the feature selection method according to the invention.

As shown in FIG. 6, we provide a training bit stream 601 to the feature extraction units 201–202. The feature extraction units extract the candidate features 500. The candidate features 500 are subject to a feature selection process 602, which outputs a subset of features 603 for input to the prediction neural network 400.

Sequential Forward Selection and General Regression Neural Network

The feature selection 602 can be performed according to one of the following three feature evaluation and selection procedures.

In a first procedure, we use a non-linear one-pass selection based on a sequential forward selection (SFS), and a general regression neural network (GRNN) to select a subset of relevant features 501–505 for traffic prediction. The principles of SFS and GRNN are described generally by Kittler, in "*Feature set search algorithms,*" Pattern Recognition and Signal Processing, C. H. Chen, Ed. Sijthoff & Noordhoff, 1978, and Specht in "*A general regression neural network,*" IEEE Trans. Neural Networks, vol. 2, no. 6, pp. 568–576, 1991, respectively. They do not describe the combination of SFS and GRNN, and the combined use for feature selection in a network resource allocation context.

The SFS procedure selects the best single feature as the first feature of the subset 501. Next, each of the other candidate features is evaluated with the first feature to find the best two features including the first feature. This is repeated until a desired number of features have been selected. The SFS method is suitable for this purpose because it is capable of incrementally constructing relevant subsets from a single feature. Thus, the construction of subsets of features can be done without requiring the observation of many possible subsets.

Figure 7A:
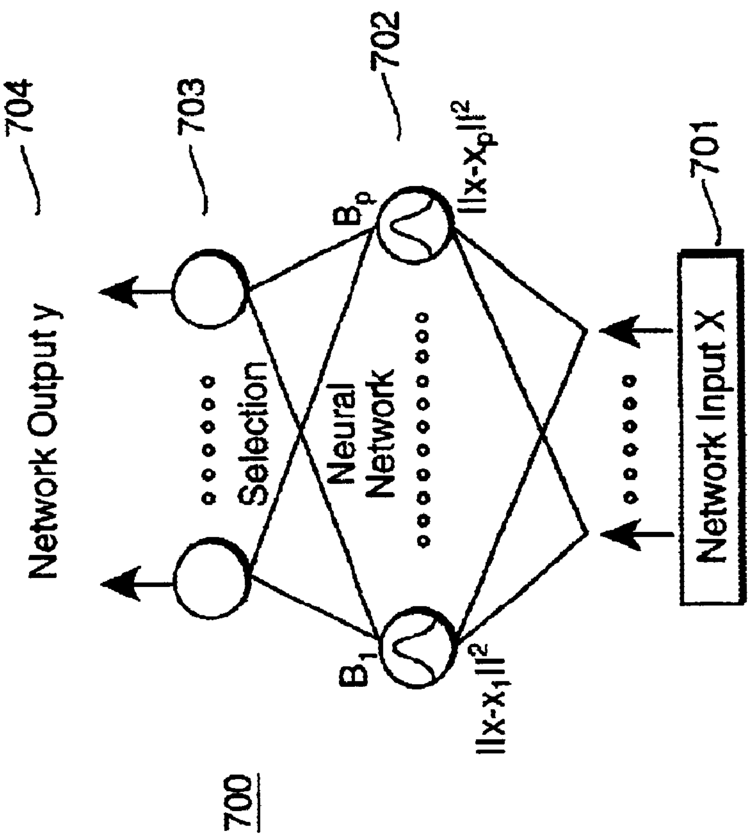
FIG. 7*a* is a block diagram of a selection neural network for selecting features.

As shown in FIG. 7*a*, a selection neural network 700 is used to efficiently evaluate the relevancy of individual candidate subsets without requiring an iterative process. The parameters of the selection neural network 700 can be directly determined in a single pass of training. This allows rapid evaluation of individual feature subsets in terms of their relevancy. The training can be done off-line (statically) prior to transferring bit streams, or dynamically as bit streams are transferred.

To evaluate the relevancy of the subset features 501–505, we consider the mean square error (MSE) between actual and estimated values of traffic features. In a preferred embodiment, the actual and estimated values are expressed in terms of principal components (PCA) of D-BIND traffic features. D-BIND traffic features are described in greater detail below. Consider the full feature set F 500 and the mapping of the subset of features $F_m$ 501–505. We denote the training data by $(x_{F,p}, y_p)$, where $x_{F,p}$ is the p-th feature in the set of P full features 500, and $y_p$ is ground truth data that we wish to approximate, i.e., actual DBIND-PCA values. The mapping of each feature from the subset of features to the approximated data is denoted by $g(x_{F_m,p})$. Given this, the MSE is defined by $$D_{F_m} = \frac{1}{P}\sum_{p=1}^{P} \|y_p - g(x_{F_m,p})\|^2$$

Beginning with the empty subset for $F_m$, we individually evaluate the relevancy of remaining features in the complementary set, i.e., F-$F_m$. At each iteration, a new feature is added to the subset $F_m$. At the end of this process, the subset $F_m$ contains the minimum number of features that yield the lowest MSE.

FIG. 7*a* shows the mapping of the features that is defined by the selection neural network 700. The selection GRNN 700 includes a first layer 702 and a second layer 703. As shown in FIG. 7*a*, an input vector x 701 to the selection neural network 700 yields an output vector y 704. For our system, the input vector x 701 is actual candidate feature subsets as constructed by SFS, and the output vector y 704 is an estimated value of the DBIND-PCA values. Units of the first layer 702 of the GRNN 700 adopt Gaussian kernels as non-linear transfer functions, while the second layer includes linear summation units Σ 703. The centers and widths of the Gaussian kernels of the first layer 702 are represented as deterministic functions of the training data. In other words, no iterative training procedures are required to reconstruct the mapping using the GRNN 700. Thus, this method enables rapid evaluation of the relevancy of different subsets of features.

Given the set of training data, we associate each sample point with a single Gaussian kernel of the first network layer 702. The input vector x 701 is assigned as the center of the kernel. For an arbitrary input vector, the output of the p-th unit is given by $$\beta_p = \left[\frac{(x - x_p)^T(x - x_p)}{2\sigma^2}\right]$$

where σ is a user-specified smoothing parameter. The GRNN output 704 which represents the estimated function value for x is given by the following convex combination, $$y = \sum_{p=1}^{P} \alpha_p y_p$$

where the coefficients $\alpha_p$ are defined as follows $$\alpha_p = \frac{\beta_p}{\sum_{i=1}^{P} \beta_i}$$

Intuitively, the GRNN 700 performs interpolation by linearly combining the given training outputs using a set of adaptively determined coefficients.

Consistency Measure-Based Feature Selection

Figure 7B:
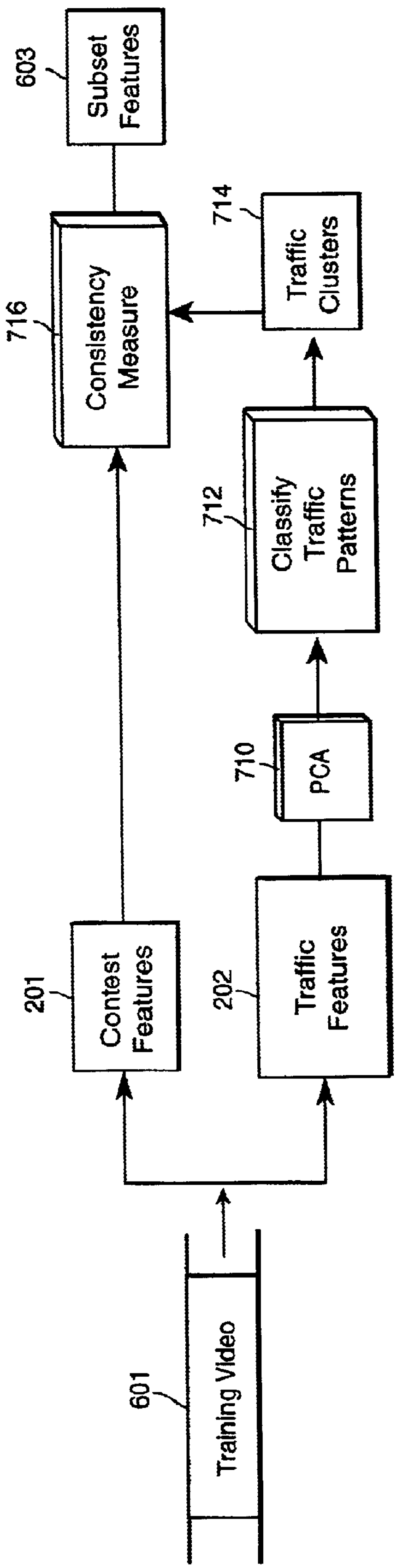
FIG. 7*b* is a block diagram of a process for selecting features according to consistency measures.

A second evaluation procedure, shown in FIG. 7*b*, is consistency measure-based. Here, content and traffic features 201–202 are extracted from the training video 601, as described above. Principal component analysis (PCA) 710 is applied to the traffic features 202. The principal components of the traffic features are classified 712 into k traffic clusters 714. Classification can be done via K-means, expectation-maximization, or other classification methods.

A consistency measure C for each set of features is determined 716:

$$C = \frac{\text{MEAN\_INTER\_CLASS\_DISTANCE}}{\text{MEAN\_INTRA\_CLASS\_DISTANCE}}$$

We want the classes to be compact and well separated from other classes. Therefore, a good feature has a small intra-class distance, and large inter-class distance, yielding a large consistency measure C. The distance measure can be Euclidean. The preferred consistency measure considers content features that are related to traffic in a monotonic way.

We select a subset of features 603 that give the largest C values. In decreasing order of importance, these features include an I-frame spatial complexity 501, the mean magnitude of the acceleration vectors 502, the mean magnitude of the motion vectors 503, and the spatial variance of the motion vectors 504. Other features can also be used if they increase the consistency measure C.

The first, I-frame spatial complexity, directly affects peak bandwidth requirements for future I-frames in the segment, and indirectly, peak bandwidth requirements of P and B frames. The spatial complexity can be estimated using a weighted sum of the magnitudes of the AC coefficients for each macroblock of the I-frame.

Motion vectors from adjacent P frames are subtracted to form "acceleration" vectors. The mean magnitude of the acceleration vectors forms our second content feature, $$\|\overline{accel}\| = \frac{1}{MN}\sum_{ij} \|\vec{m}_k(i, j) - \vec{m}_{k-1}(i, j)\|$$

Where $\vec{m}_k$ is a forward motion vector for macroblock (i, j) of frame k, and M and N are the frame dimensions in macroblocks. A high value of the mean magnitude indicates that the motion in the video is complex, and that the residue frames will become increasingly complex, thus requiring more bits.

Similarly, the mean magnitude of the motion vectors is a measure of how much motion compensation is needed, and therefore, an indication of how complex the residue frames are likely to be. Finally, we measure the spatial covariance of the x and y motion vector components.

Hybrid SFS/GRNN and Consistency Based Feature Selection

Figure 7C:
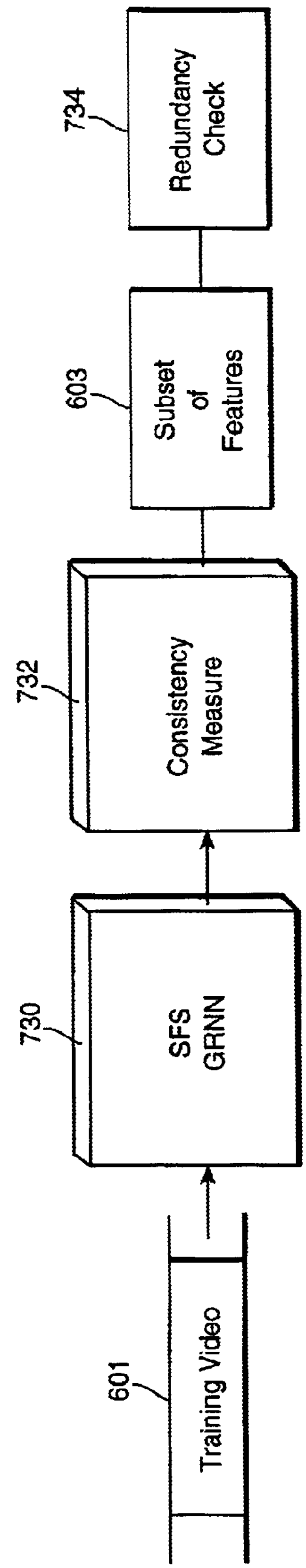
FIG. 7*c* is a block diagram of a hybrid feature selection process.

A third technique for feature selection uses a hybrid approach as shown in FIG. 7*c*. First, the SFS/GRNN procedure 730 is used to select a subset of features. Then, the subset is refined 732 to the final subset of features 603 for the prediction neural network 400 on the basis of the consistency measures of the candidate features. The hybrid technique yields improved results when the number of selected features is large. In this case, the approximation error of the SFS/GRNN procedure becomes significant due to the high-dimensional space. As the confidence in the SFS/GRNN feature selection procedure diminishes around and beyond he minimum MSE point, we adopt the complementary follow-up step based on the consistency measure. This approach is able to reduce the traffic prediction error even further.

Traffic Descriptors

Many descriptors of traffic are known. Among them, the peak rate, the average rate, and the mean rate are simple ones. However, these descriptors do not capture the traffic patterns over different time scales. To overcome this problem, and as described above with reference to FIG. 7, we prefer a deterministic bounding interval dependent traffic descriptor (D-BIND) as described by Knightly et al. in "*D-BIND: An accurate traffic model for providing QoS guarantees to VBR traffic*," IEEE Tr. Networking, vol. 5, no. 2, pp. 219–231, 1997. Other descriptors, that correctly characterize traffic features over different time scales, can also be used.

D-BIND is a vector that includes a maximum allowed arrival rate for various time intervals. D-BIND provides a performance guarantee for the worst case. It is defined as follows.

The cumulative number of bits arriving during a time interval beginning at time τ and of a length t is A[τ, τ+t]. A tightest bound over all time, called the empirical envelope, is:

$$B^*(t)=\sup A[\tau, \tau+t].$$

A piecewise-linear bounding function $B_{W_T}$ is constructed, where $$W_T=\{(q_k, t_k)|k=1, 2, \ldots, p\}$$

is a vector of bit arrival and interval pairs. Given a set of $t_k$, the tightest function is denoted $B^*_{W_T}$.

The D-BIND descriptor is usually expressed in terms of arrival rates:

$$R_T=\{(r_k, t_k)|k=1, 2, \ldots, p\},$$

where $r_k=q_k/t_k$. This descriptor captures both the short-term "burstiness" and the long-term traffic characteristics of a bit stream, while being relatively simple to implement in admission control and policing.

Fixing $[t_1, \ldots, t_p]$, D-BIND can be described by a vector $[r_1, \ldots, r_p]$ We use $r_1$ through $r_4$ 505 FIG. 5 of the short-term observed traffic features as inputs to our prediction neural network 400.

When describing an entire segment, the dimensionality of D-BIND becomes large and the prediction complexity goes up. Such an increase is rather wasteful as there is some redundancy in D-BIND. For example, the value $r_k$ approaches the mean bit-rate for large k.

Redundancy Check

In order to reduce prediction complexity, we provide two solutions in the form of a redundancy check 734, as shown in FIG. 7*c*.

In a first embodiment, we apply principal component analysis (PCA) to the selected subset of features and use the first N principal components as input descriptors to the prediction neural network 400. Thus, the prediction neural network 400 can dynamically predicts the N values.

In a second embodiment, we directly determine cross-correlations between pairs in the selected subset of features. Given that certain pairs of features exhibit high correlation, we can reduce the size of the subset by eliminating redundant features.

Detailed Structure of Dynamic Resource Allocation

Figure 8:
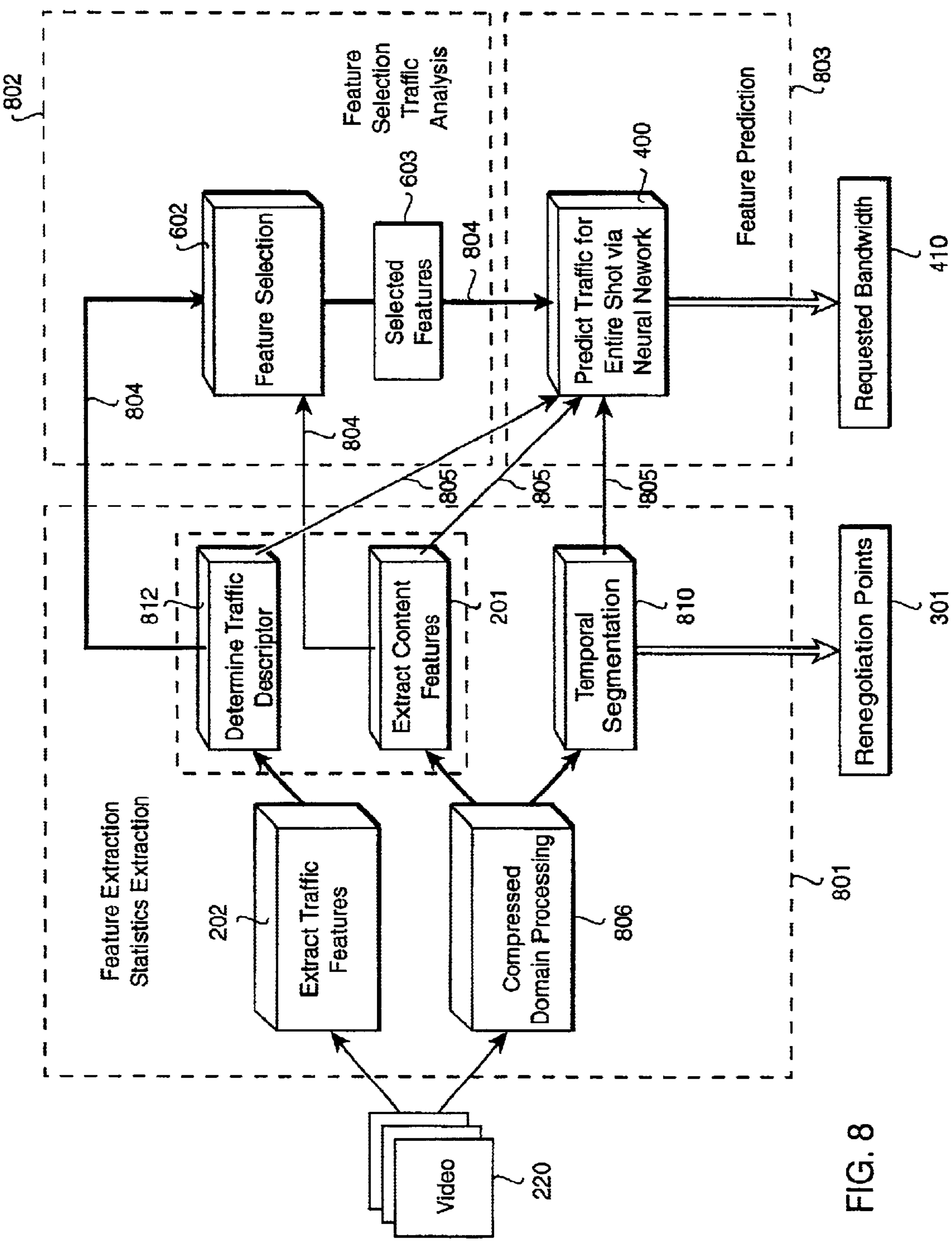
FIG. 8 is a detailed block diagram of a dynamic resource allocation method and system according to the invention.

The detailed structure of our method is shown in FIG. 8. There are three major blocks, feature extraction 801, feature selection and traffic analysis 802, and traffic prediction 803. The heavy lines 804 indicate data flows used during training and feature selection as described with respect to FIGS. 5–7*a*–*c*. As stated above training can be performed off-line or dynamically. The light lines 805 indicate data flows during dynamic resource prediction.

Compressed domain processing 806 can use windowed relative thresholds on the sum of absolute pixel differences to perform temporal segmentation 810 of the input multimedia 220 to determine the renegotiation points 301 and the following observation periods 401 of FIG. 4. The features extracted during the observation periods are passed forward for feature selection 602 using any of the three procedures described above. The selected subset of features is passed to the prediction neural network 400.

A traffic descriptor 812 is derived from the extracted traffic features 202. The descriptor is can be used to classify traffic patterns as described above. The dimensionality of the patterns can be reduced by principal component analysis, and a reduced dimensionality traffic descriptor is provided to the prediction neural network 400 to be used in conjunction with the final subset of selected features 603 to predict the network resources 410 to be requested at the renegotiation points 301.

Effect of Dynamic Resource Allocation

We compare channel utilization using our method with known bit stream level approaches. We also evaluate the contribution of content and traffic features of short observation periods to resource prediction. In the comparison we use a 13175 frame video, about 7 minutes, digitized from cable television at 30 frames per second. The video is encoded via MPEG-1 VBR of a fixed quantization step size, with an average bit-rate of 2.1 Mbps.

Link Utilization

The RED-VBR scheme, described by Zhang et al. in "*RED-VBR: A new approach to support delay-sensitive VBR video in packet-switched networks*," in Proc. NOSSDAV, pp. 258–272, 1995, is a heuristic renegotiation method. That method raises the reserved bandwidth, as described by D-BIND, by a factor α when the real bandwidth exceeds the current reservation, and lowers it by a factor β when the real bandwidth remains below the reserved resource for K frames. The average R-VBR renegotiation frequency is dependent on α, β, and K.

In contrast, our method uses renegotiation points at video boundaries obtained from the content-based temporal segmentation 810. We identified 177 segments in the sample video. Bandwidth reservations comprise two D-BIND principal components from our prediction neural network 400. We train the prediction neural network 400 by one hundred sweeps with data from the first fifty segments.

Figure 9:
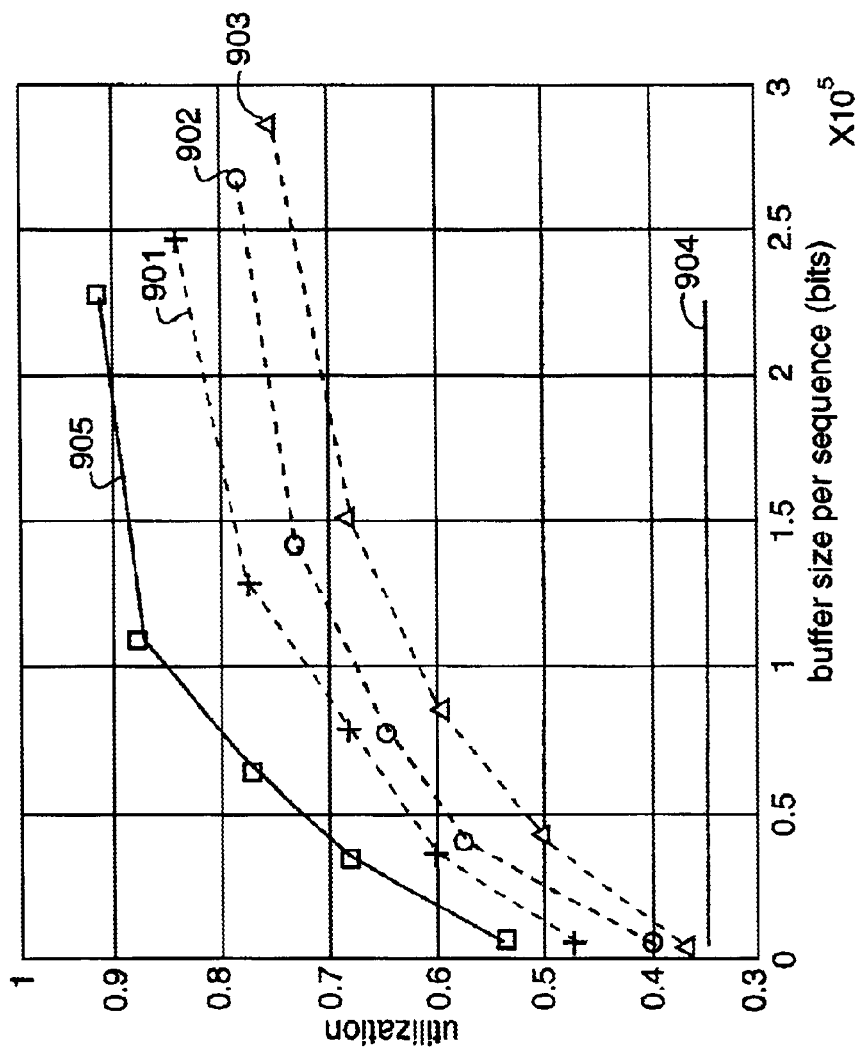
FIG. 9 is graph comparing network utilizations.

Link utilization is obtained by trace-driven simulation, similar to that described by Bocheck et al. Multiple video sources, based on the above described sample video but with random starting points, are multiplexed into a T3 line with a bandwidth of 45 Mbps. The results of the comparison are shown in FIG. 9.

With three sets of parameters specified, renegotiation requests from RED-VBR were generated at average intervals of 0.81, 1.54, and 2.23 seconds. The corresponding utilizations are shown by dashed curves 901–903. The horizontal line 904 shows the utilization when the peak bandwidth is allocated to each segment. The upper solid curve 905 is the utilization according to our method, which renegotiates once every 2.48 seconds, on the average. Our method outperforms the RED-VBR scheme of similar renegotiation frequency by 18% as shown by curve 903, and by 9% against the RED-VBR with tripled renegotiation frequency as shown by curve 901.

Mean Square Error (MSE) of Traffic Prediction

Figure 10:
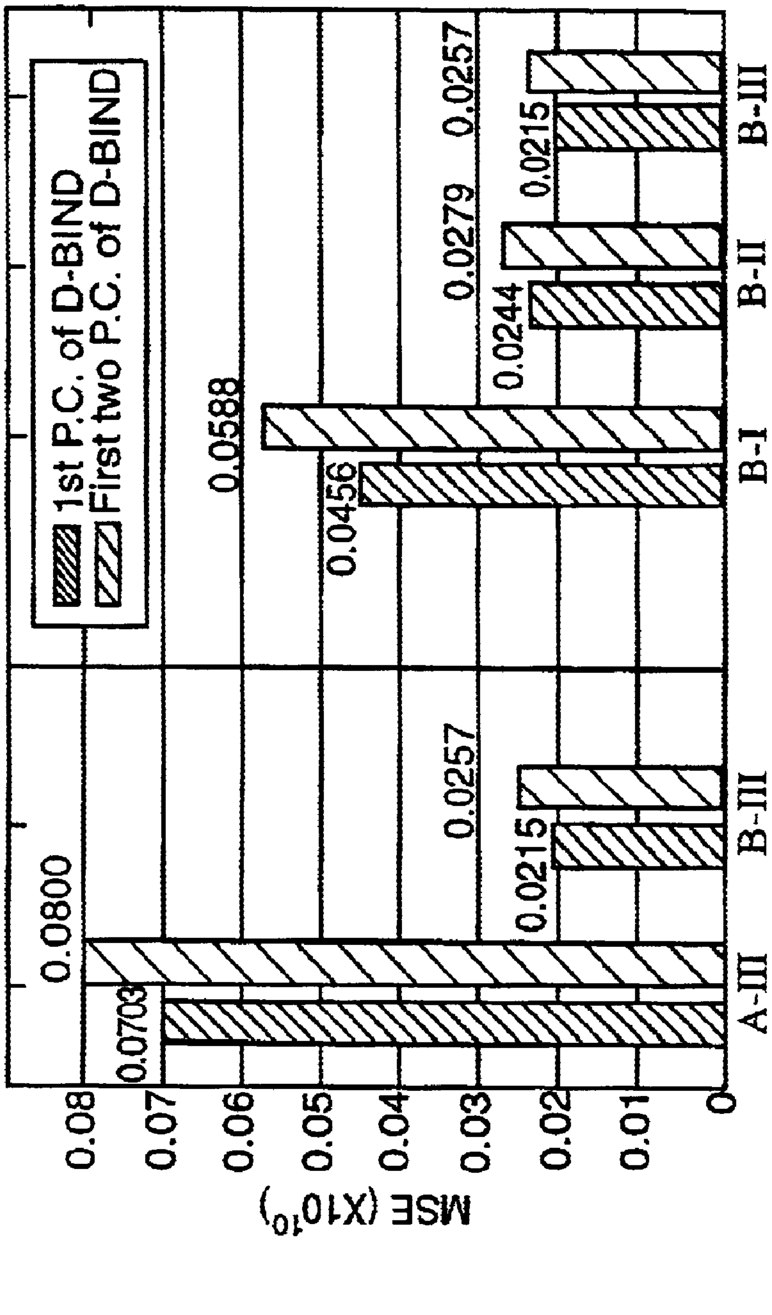
FIG. 10 is a graph comparing prediction mean square errors.

In FIG. 10, we compare the MSE of prediction under four different strategies, keeping in mind that overestimation of traffic descriptors can lower utilization, while underestimation can degrade QoS.

With respect to renegotiation points, we consider:

(A) using equal-length request intervals, e.g., one request every 75 frames, which is the average segment length, and (B) using observation periods obtained from temporal segmentation.

We consider three different neural network inputs for traffic prediction, all based on features extracted during the observation periods:

(I) four content features alone, (II) the 4-dimensional traffic features alone, and (III) combined content and traffic features according to our invention.

FIG. 10 shows the MSE values different inputs to our neural network. Comparing the two leftmost columns, A-III and B-III, it can be seen that B-III gives a much smaller MSE. This means that content-based renegotiation points are by far superior to non-content-based ones. Comparing the three rightmost columns, we see that short-term traffic B-II gives better prediction than content features alone B-I. We also find that using combined content features and short-term traffic features B-III is better than using short-term traffic features alone B-II.

Constant Bit-Rate Resource Prediction

Our method can also be used in applications where CBR transcoders and encoders are used. The CBR video stream is segmented as above, although the lengths of the segments can be much longer than for a VBR bit stream. Each segment is then transmitted at an appropriate constant bit rate predicted during an observation period at the beginning of the segment. This leads to a piece-wise estimation of bandwidth over time for the CBR bit stream.

We have described a method for dynamically allocating network resources to multimedia bit streams. A content-based approach for determining optimal renegotiation points improves network utilization over non-content-based methods. In traffic prediction, using short-term traffic features as well as content features as inputs to a prediction neural network is more effective than using either content or traffic features alone.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for dynamically allocating network resources while transferring a bit stream in a network, comprising:

extracting first content features from the bit stream to determine renegotiation points and observation periods, in which the bit stream is compressed;

extracting second content features and traffic features from the bit stream during the observation periods; and combining the second content features and the traffic features to predict the network resources to be allocated at the renegotiation points.

2. The method of claim 1 wherein the bit stream is transferred at a variable bit-rate.

3. The method of claim 1 wherein the bit stream is transferred at piece-wise constant bit-rates.

4. The method of claim 1 wherein the bit stream includes multimedia data.

5. The method of claim 1 wherein the second content features and the traffic features are combined in a prediction neural network.

6. The method of claim 1 further comprising:

identifying a set of candidate features; and selecting a subset of the candidate features as the second content features and the traffic features.

7. The method of claim 6 wherein the set of candidate features are identified in a training bit stream.

8. The method of claim 6 wherein the subset of features is selected by sequential forward selection.

9. The method of claim 8 further comprising:

evaluating a relevancy of the selected subset of features using a selection neural network.

10. The method of claim 9 wherein the selection neural network is a general regression neural network.

11. The method of claim 6 wherein the subset of features is selected statically prior to transferring the bit stream.

12. The method of claim 6 wherein the subset of features are selected dynamically as the bit stream is transferred.

13. The method of claim 1 further comprising:

classifying a training bit stream into traffic clusters based on the set of candidate features; and determining a consistency measure for each candidate feature based on said traffic clusters; and selecting a predetermined number of candidate features with the highest consistency measure as the subset of features.

14. The method of claim 13 further comprising:

determining a mean inter-class distance for each candidate features;

determining a mean intra-class distance for each candidate features; and dividing the mean inter-class distance by the mean intra-class distance to determine the consistency measure for each content features.

15. The method of claim 6 wherein the selected subset of features include an I-frame spatial complexity, a mean magnitude of acceleration vectors, a mean magnitude of motion vectors, and a spatial variance of the motion vectors.

16. The method of claim 13 wherein the consistency measure considers content features that are related to the traffic features in a monotonic way.

17. The method of claim 15 further comprising:

estimating the I-frame spatial complexity by a weighted sum of magnitudes of AC coefficients for each macroblock of the I-frame.

18. The method of claim 15 further comprising:

subtracting motion vectors from adjacent P frames to form acceleration vectors; and determining the mean magnitude of the acceleration vectors by:

$$\|\overline{accel}\| = \frac{1}{MN}\sum_{ij}\|\vec{m}_k(i,j)-\vec{m}_{k-1}(i,j)\|$$

where $\vec{m}$ is a forward motion vector for macroblock (i, j) of frame k, and M and N are dimensions of the frame in terms of macroblocks.

19. The method of claim 6 wherein the subset of features is selected by sequential forward selection, and further comprising:

classifying the training bit stream into traffic clusters based on the set subset of features;

determining a consistency measure for feature of the subset of features;

selecting a predetermined number of features of the subset with the highest consistency measure as a final subset of features.

20. The method of claim 1 further comprising:

expressing the traffic features as a vector that includes a maximum allowed arrival rate for bits for various time intervals.

21. The method of claim 5 further comprising:

applying principal component analysis to the subset features; and providing the first N principal components as input descriptors to the prediction neural network.

22. The method of claim 5 further comprising:

determining cross-correlations between pairs of the subset of features to reduce the size of the subset.

23. The method of claim 8 further comprising:

constructing a plurality of candidate subsets of features;

determining a mean square error between actual and estimated values of features of each candidate subset of features; and selecting the candidate subset of features with a minimum number of features that yield a lowest mean square error as the subset of features.

24. A system for dynamically allocating network resources while transferring a bit stream in a network, comprising:

a feature extraction unit configured to extract first content features, second content features, and traffic features from the bit stream during the observation periods, in which the bit stream is compressed;

means determining renegotiation points and observation periods in the bit stream from the first content features; and a prediction neural network configured to combine the second content features and the traffic features to predict the network resources to be allocated at the renegotiation points.

* * * * *